United States Patent Office 3,134,537
Patented May 26, 1964

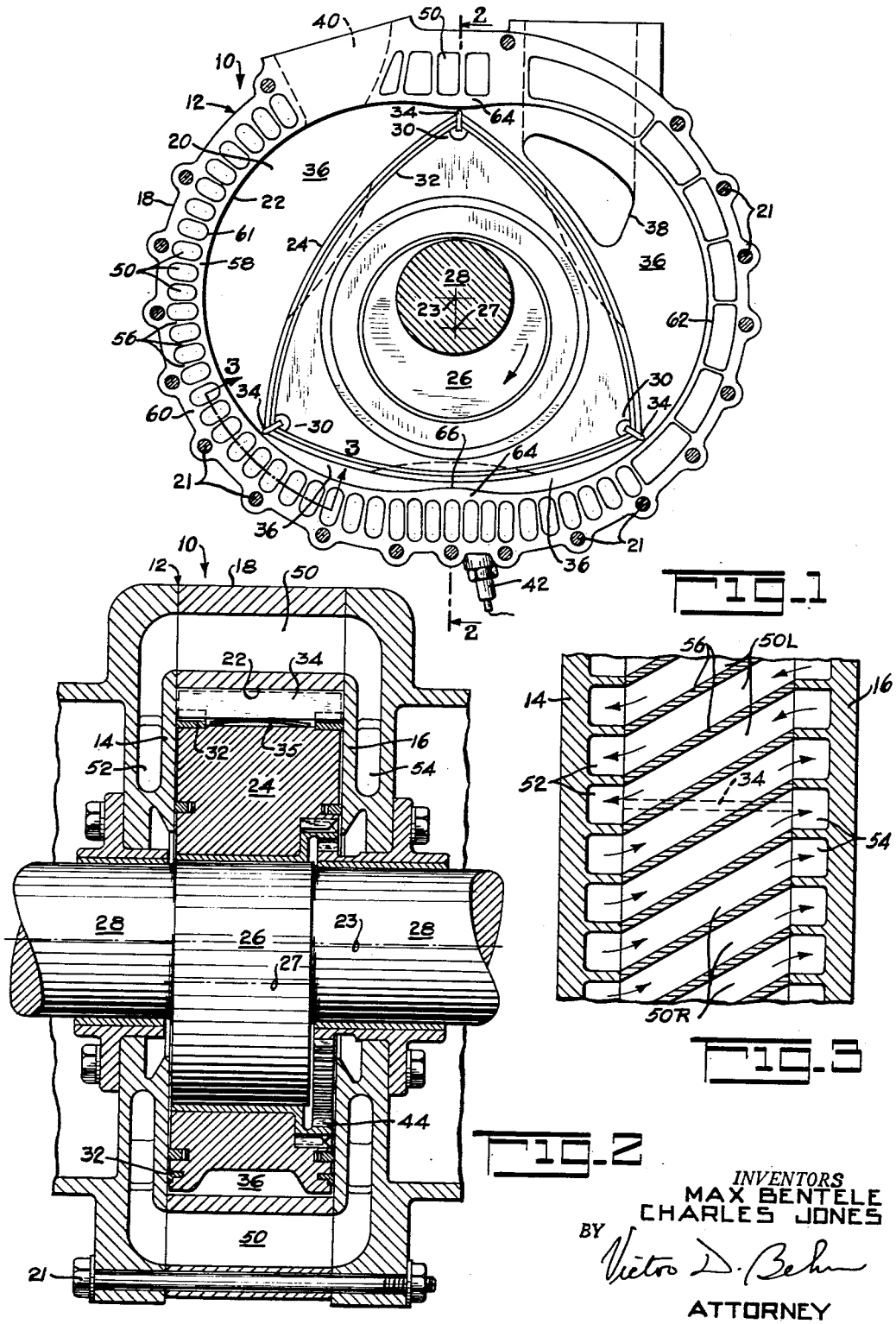

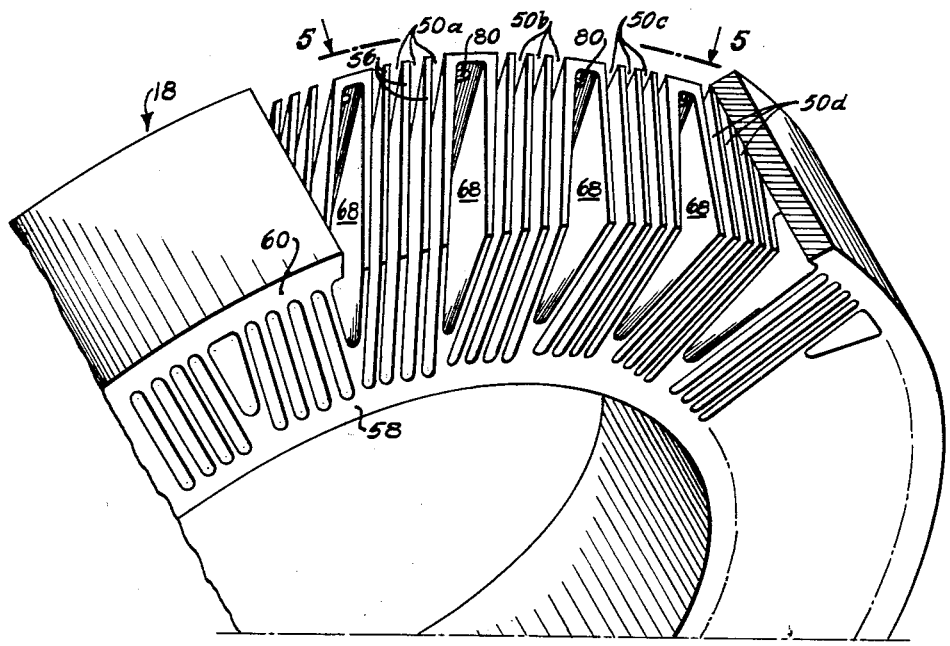
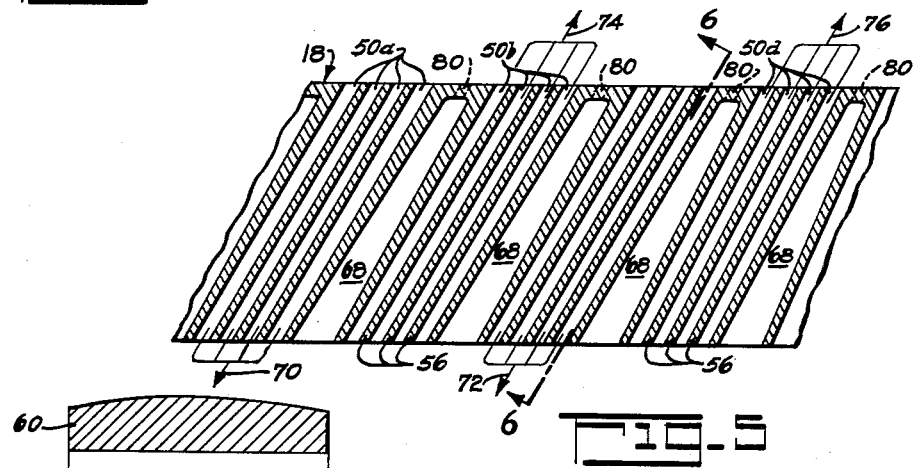
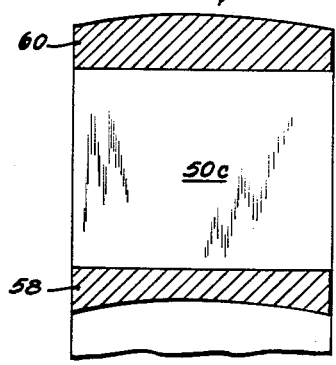

3,134,537
COOLING STRUCTURE FOR ROTARY
MECHANISMS
Max Bentele, Ridgewood, and Charles Jones, Paramus,
N.J., assignors to Curtiss-Wright Corporation, a corporation of Delaware
Filed Feb. 15, 1962, Ser. No. 173,542
8 Claims. (Cl. 230—210)

This invention relates to rotary mechanisms and is particularly directed to a cooling system for such mechanisms.

The invention is particularly useful in connection with rotary mechanisms similar to that disclosed in U.S. Patent Nos. 2,988,065 and 3,007,460.

Such a rotary mechanism comprises an outer body having a cavity therein and an inner body relatively rotatable within said cavity, about an axis laterally spaced from but parallel to the axis of said cavity. The outer body has axially-spaced end walls and a peripheral wall interconnecting the end walls to form said cavity, the inner surface of the cavity peripheral wall having a multi-lobe profile which preferably is basically an epitrochoid. The inner body has end faces disposed adjacent to said outer body end walls for sealing co-operation therewith and has a peripheral surface with a plurality of circumferentially-spaced apex portions, each carrying a radially-movable seal for sealing engagement with the multi-lobe inner surface of the outer body peripheral wall to form a plurality of working chambers between the two bodies which vary in volume upon relative rotation of the two bodies. Each such apex seal of the inner body runs axially from one end face to the other of the inner body.

By suitable arrangement of porting, such a rotary mechanism may be used as a fluid motor, a fluid pump, or a combustion engine. The invention is of particular importance in connection with a rotary mechanism designed for use as a rotary combustion engine and will be so described.

In order to cool the outer body the walls of the outer body are made hollow and are divided into a plurality of passages for the flow of a suitable coolant fluid therethrough, for example, as shown in aforementioned Patent No. 3,007,460.

As illustrated in said Patent No. 3,007,460 the hollow peripheral wall of the outer body comprises a continuous inner wall part from which a plurality of ribs project radially outwardly and interconnect with an outer wall part to form coolant passages between the ribs. As illustrated in Patent No. 3,007,460 the coolant-passage-forming ribs run axially from one end wall to the other of the outer body.

The inner wall of the hollow outer body is made quite thin in order to provide for adequate cooling of the inner surface of said peripheral wall. As a result of the axially-extending passage-forming ribs projecting outwardly from this thin inner wall, a minute ribbing or washboard effect tends to be produced on the inner surface of said inner wall, for example, as a result of internal pressures and differential thermal expansions which exist during engine operation. If the coolant-passage-forming ribs run in an axial direction, said minute ribbing of the peripheral wall inner surface is likewise axial and as a result tends to produce chattering of each apex seal as said seal moves over said peripheral wall inner surface and successively strikes the minute axial ribs on said inner surface.

An object of this invention resides in the provision of a cooling structure for the outer body peripheral wall such that the aforementioned seal chattering is minimized.

Another object of the invention is the provision of a strong and yet lightweight structure for the outer body peripheral wall.

In accordance with the invention the coolant-passage-forming ribs of the outer body peripheral wall are inclined to the axis of the outer body cavity. This inclination of the coolant-passage-forming ribs strengthens the outer body peripheral wall thereby minimizing any tendency for the formation of internal ribbing on the peripheral wall inner surface. In addition any minute internal ribbing that is formed on said inner surface has an inclination similar to that of the passage-forming ribs. Although inclined to the outer body axis, said passage-forming ribs and the passages formed by said ribs, like the axial passage-forming ribs and inter-rib passage of Patent No. 3,007,460, run from one end wall to the other of the outer body. As a result of the inclined attitude of said minute internal ribbing, each apex seal in effect slides along each such minute inner surface rib instead of striking the full length of each inner surface rib as the inner body rotates relative to the outer body. In this way there is a substantial lessening of any tendency for the apex seals to chatter as a result of contact with minute ribs produced on the inner surface of the peripheral inner wall portion because of the coolant-passage-forming ribs formed integral with and projecting outwardly from this inner wall portion.

The detailed design of such inclined passages in the hollow peripheral wall of a rotary mechanism, such as shown in the aforementioned patents, is adjusted to the most economical methods of fabrication for both ferrous and light alloys. The inner part of the hollow peripheral wall of the outer body could be formed with integral ribs by using individual radially-removable cores for casting said ribs. The radially outer portions of each such passage would be closed by a suitable outer shell or wall portion disposed across the radially outer portions of said ribs. This mode of fabrication of the passage-forming ribs with individual radially-removable cores is possible but would be an expensive procedure for high production rates.

A further object of the invention resides in the provision of a novel arrangement of the coolant flow passages, which extend in an axially inclined direction through the hollow peripheral wall from one end wall to the other of the outer body, such that fabrication of said passages is facilitated and at the same time the aforementioned tendency of the apex seals to chatter is minimized. For this purpose the axially-inclined coolant-flow passages through the outer body peripheral wall preferably are arranged in groups of adjacent passages with the passages of each group being disposed parallel to each other in the direction of coolant flow therethrough from one end wall to the other of the outer body and with the passages of at least certain groups being inclined to its neighboring passage group. The walls of each passage group are made straight and parallel to each other in the direction of coolant flow through said passages, whereby the cores used for casting the coolant-passage-forming ribs of said group can be formed and/or removed as a group by pulling the cores out in said direction.

With this latter construction each passage of the outer body peripheral wall running from one end wall to the other of the outer body is inclined to the outer body axis and its inner wall surfaces are straight in the direction of coolant flow therethrough. Because of this straight and inclined construction, those passages disposed about the arcuate portions of the peripheral wall inner surface will have a non-uniform wall thickness between said passage and inner surface. It will be apparent that this wall thickness may be made a maximum adjacent to the ends of said passages and a minimum adjacent to the center of said passage. This latter construction will result in a more uniform peripheral wall inner surface temperature because although the greater inner wall thickness at the ends of the passages will reduce the cooling effectiveness at said ends, heat is also conducted away from said ends direct to the end walls.

Other objects of the invention will become apparent upon reading the annexed detailed description in connection with the drawing in which:

FIG. 1 is a transverse sectional view through a rotary combustion engine embodying the invention;

FIG. 2 is a sectional view taken along the line 2—2 of FIG. 1;

FIG. 3 is a developed sectional view taken along line 3—3 of FIG. 1;

FIG. 4 is a perspective view illustrating a slightly modified construction;

FIG. 5 is a developed sectional view taken along line 5—5 of FIG. 4; and

FIG. 6 is a sectional view taken along line 6—6 of FIG. 5.

Referring first to FIGS. 1 and 2 of the drawing, a rotary combustion engine 10 is illustrated as comprising an outer body 12 having end walls 14 and 16 and a peripheral wall 18 disposed between and interconnecting said end walls to form a cavity 20 between said end walls. The walls 14, 16 and 18 are suitably connected together as by bolts 21. The inner surface 22 of the peripheral wall 18 has a multi-lobe profile which preferably is basically an epitrochoid having an axis 23 along which the end walls 14 and 16 are spaced. An inner body or rotor 24 is received within the cavity 20, said rotor being journaled on an eccentric portion 26 of a shaft 28. The axis of the shaft 28 is co-axial with the axis 23 of the outer body and the axis 27 of the eccentric portion 26 is parallel to but laterally spaced from the axis 23. The rotor 24 has a plurality of apex portions 30, one more in number than the number of said lobes.

Suitable seal means 32 are provided between each end face of the rotor and the adjacent end walls 14 and 16 of the outer body 12 and each rotor apex portion 30 has seal means 34 extending in a direction parallel to the rotor axis from one of said end walls to the other. Each apex seal means 34 is received within a slot in its apex portion 30 and is radially movable outwardly, for example, by a spring 35, into sealing engagement with the inner surface 22, of the peripheral wall 18. With this arrangement a plurality of working chambers 36 are provided between the rotor 24 and the outer body 12, said chambers 36 varying in volume as the rotor 24 rotates relative to the outer body.

The engine 10 is also provided with an intake port 38 for the intake charge and with an exhaust port 40 for the engine exhaust gases. As illustrated, the engine may also have a spark plug 42 for initiating combustion or it may operate on a diesel cycle, in which case a spark plug may not be used. In addition, an internal gear 44 is co-axial with and is connected to the rotor 24. The internal gear 44 is in mesh with an external gear 46 secured to an end wall of the outer body to help maintain the proper rotative position of the rotor 24 relative to the outer body 12 during engine operation. The gear 46 is co-axial with the shaft 28. Reference is made to Patent No. 2,988,065 for a more detailed description of such an engine.

The outer body peripheral wall 18 is provided with suitable passages 50 for the flow of a coolant therethrough from one end wall 14 or 16 to the other. The peripheral wall passages 50 are interconnected by passages 52 and 54 in the end walls 14 and 16, preferably so that the passages 50 are arranged in circumferentially-spaced serially-connected groups of passages such that the coolant fluid flows first from one end wall 14 or 16 to the other through one group of passages 50 and then returns to said end wall through an adjacent group of said passages 50. In this way the direction of flow of the coolant fluid between the end walls 14 and 16 reverses as the coolant proceeds from a group of peripheral wall passages 50 to a circumferentially adjacent group. In FIG. 3 the passages in which the coolant flow is toward the left end wall 14 are designated by reference numeral 50L and the passages in which the coolant flow is in the opposite direction toward the right end wall 16 are designated by reference numeral 50R. Such an arrangement of the coolant passages 50, 52 and 54 in the outer body is fully described in aforementioned Patent No. 3,007,460.

The passages 50 are formed by ribs 56 which project radially outwardly from the inner part 58 of the hollow peripheral wall 18. The outer portions of these passages are closed by the outer part 60 of said wall. As described in Patent No. 3,007,460, the spacing of the coolant passage forming ribs 56 and the number of coolant passages 50 in each R and L group varies about the periphery of the peripheral wall because of differences in the heat rejection rate to said wall about its periphery during engine operation.

As already stated, because of the ribs 56, a minute ribbing or washboard effect is produced on the peripheral wall inner surface 22. If the ribs 56 run in a direction parallel to the engine axis from one end wall 14 or 16 to the other, as in Patent No. 3,007,460 then said minute internal ribbing on the inner surface 22 will likewise run in said axial direction and would tend to enhance or produce chattering of said apex seal means 34 as said seal means moves over said inner surface and successively strikes said minute ribbing.

In accordance with the present invention, however, instead of running in a direction parallel to the engine axis the ribs 56 are inclined to said axis as is illustrated in FIG. 3 and any minute internal ribbing or washboard effect produced on the internal surface 22, as a result of the ribs 56, is similarly inclined. Hence, with this arrangement each apex seal 34 as it moves under the inclined ribs 56 is likewise inclined to the minute ribbing or washboard effect produced on the inner surface 22 by the ribs 56. Therefore, instead of successively striking said minute internal ribbing as the engine operates an apex seal 34 will simply slide at an angle over the tops of said ribbing. This is particularly so if, as illustrated in FIG. 3, the ribs 56 are sufficiently inclined so that each apex seal 34 always bridges across at least two ribs 56. This inclined arrangement of the coolant passage forming ribs 56 also serves to strengthen the peripheral wall as compared to a peripheral wall with axial ribs as in said Patent No. 3,007,460, thereby minimizing any tendency of the ribs 56 to produce a minute ribbing or washboard effect on the inner surface 22.

The hollow peripheral wall 18 may be fabricated by casting metal about individual cores for forming the passages 50. However, for reasons of economy the passage forming cores preferably are arranged in groups so that the cores of each group may be formed or removed simultaneously. Also, if the peripheral wall 18 is made of a lightweight alloy then, because of the relatively low melting temperatures of such alloys, the passage-forming cores may be made solid of a metal having a higher melting temperature and the cores may be connected together in groups for retraction of each group as a unit.

Although the inner surface 28 of the inner part 58 of the peripheral wall 18 preferably is basically an epitrochoid, for ease of fabrication its outer surface from which the ribs 56 project outwardly may consist of two semi-cylindrical portions 61 and 62, about the lobe portions of the epitrochoid, and interconnected by flat portions 64. Hence, around each of the two lobes or cylindrical portions 61 and 62 the cores for forming the passages 50 may be helically disposed about the axis of the shaft 28 and connected together as a group. With this arrangement, after casting the peripheral wall 18, each of the two helical groups of said cores can be retracted as a unit by a helical motion and the resulting ribs 56 formed about said lobe portions 61 and 62 are likewise helically disposed about the axis of the shaft 28. Along each of the flat portions 64 the passage-forming cores preferably are straight but extend in a direction inclined to the direction of the axis of the shaft 28 whereby each of these two groups of cores can be withdrawn as a unit by a straight line motion.

If the coolant passages 50 are formed as described, the inner wall thickness of each of the passages 50 is substantially uniform except, of course, in the vicinity of the two minimum diameter portions 66 of the epitrochoid.

Instead of making the coolant passages 50 helical around the substantially semi-cylindrical portions 61 and 62, the passages may be disposed in smaller groups with each passage having straight wall surfaces and with the side walls of the passages of each group being parallel to each other but inclined slightly to the passages of the adjacent groups. Such an arrangement is illustrated in FIGS. 4, 5 and 6.

In FIG. 4, four groups of passages 50, designated as a, b, c and d groups are illustrated. The passages of each group have straight and parallel side walls and the radially inner and outer walls of these passages are also straight and parallel to permit the cores forming these passages to be withdrawn by a straight line motion after the peripheral wall is cast. The groups of passages 50a, 50b, 50c and 50d are separated by passages 68 which are V-shaped in cross section and diverge toward one side, the front side in the perspective view of FIG. 4.

With the arrangement shown, the cores for the passages 50a and 50c and the adjacent V-shaped passages may be withdrawn in the direction indicated by the arrows 70 and 72 in FIG. 5. The cores forming the passages 50b and 50d may for convenience be removed in the opposite direction as indicated by the arrows 74 and 76.

Obviously, instead of the walls of each of the passages 50a, 50b, 50c and 50d being parallel they may diverge slightly in the direction their cores are withdrawn. It should also be noted that with the inner wall of each passage 50 being straight, but inclined to the epitrochoid axis 23, the wall thickness between the passage and the inner surface 28 will vary along the passage, for example, as illustrated in FIG. 6, as contrasted with the uniform thickness obtained when the passages 50 are helical.

The passages 68 are relatively ineffective for cooling the inner surface 22 because of the relatively large inner wall thickness of said passages to the inner surface 22. Accordingly, in order not to waste coolant flow through the passages 68, flow through these passages is restricted by walls having small openings 80. In this way the coolant flow through the passages 68 is restricted to a small value which is only sufficient to avoid these passages 68 constituting a closed or dead space.

In the arrangement shown in FIG. 1, as well as that shown in prior Patent No. 3,007,460, the side walls of the coolant passages 50 are radial and therefore diverge in a radially outward direction. In the arrangement of FIG. 4, however, the side walls of the passages 50 are parallel and therefore the arrangement of FIG. 4 has improved cooling effectiveness.

Obviously, instead of a liquid coolant a gaseous coolant, such as air, may be used. Although the coolant flow reversal between the outer body side walls as described in said prior patent and illustrated in FIG. 3 may be used with air as the coolant, the cooling air may be caused to flow through the passage 50 in but one direction from one end wall 14 or 16 to the other. This latter arrangement has the advantage of requiring less pressure for producing the airflow and producing less temperature rise in the air thereby permitting a greater temperature safety margin, particularly under hot ambient conditions. If air is used as the coolant the outer part 60 of the peripheral wall 18 need not be an integral part of said wall but instead could be replaced by a thin baffle.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A rotary mechanism for fluid motors, fluid pumps, combustion engines or the like; said mechanism comprising in combination an outer body having spaced end walls and a peripheral wall attached to said end walls and having an inner surface defining a cavity with said end walls with said cavity having an axis along which said end walls are spaced; an inner body mounted for rotation in said cavity about an axis parallel but eccentric to the outer body axis, said inner body having a plurality of circumferentially-spaced apex portions, seal means carried by the inner body at each apex portion for continuous sealing engagement with the inner surface of said peripheral wall to form a plurality of working chambers between the inner and outer bodies which vary in volume upon relative rotation of the inner and outer bodies; each apex seal means being resiliently movable in the radial direction and mechanically unconnected with said inner body; each apex seal means extending in the axial direction substantially from one end face to the other of the inner body and having relatively small peripheral extension with substantially line sealing contact with the inner surface of said peripheral wall; said peripheral wall having an inner wall portion with a plurality of external ribs running from one end wall to the other and forming passages therebetween for flow of a cooling fluid through said passages; said coolant-passage-forming ribs being inclined to each apex seal means as said seal means moves along said inner surface under said ribs to preclude the occurrence of ridges on said inner surface parallel with said seal means; said ribs being spaced further apart than said peripheral extension of each apex seal; and said rib-inclination being of sufficient magnitude that each apex seal simultaneously extends across at least two adjacent ribs to preclude chattering of said apex seals in phase with said ribs and consequent intermittent sealing contact.

2. A rotary mechanism as claimed in claim 1 and in which each outer body end wall has passage means for interconnecting said peripheral wall passages into a plurality of serially-connected groups of passages such that the flow direction of the fluid coolant between said end walls reverses in flowing from one of said passage groups to the next.

3. A rotary mechanism as claimed in claim 1 and in which the inner surface of the outer body peripheral wall is basically a multi-lobed epitrochoid and the passage-forming ribs about each lobe of the epitrochoid are substantially helically disposed about said outer body axis.

4. A rotary mechanism as claimed in claim 1 and in which said peripheral wall passage-forming ribs are formed in groups of adjacent ribs with the ribs of each group being disposed parallel to each other and inclined to the ribs of adjacent groups.

5. A rotary mechanism as claimed in claim 1 and in which at least certain of said external ribs are arranged in group of parallel ribs with the ribs of adjacent groups being inclined to each other and with the ribs of each parallel group being inclined to the outer body axis.

6. A rotary mechanism as claimed in claim 5 and in which the side walls of each cooling fluid passage are formed by a pair of parallel ribs and are straight in the direction of cooling fluid flow therethrough.

7. A rotary mechanism as claimed in claim 5 and in which the radially inner wall surface of each said cooling fluid passage is straight in the direction of cooling fluid flow therethrough.

8. A rotary mechanism as claimed in claim 5 and in which said ribs also form a V-shaped outwardly-diverging passage between each adjacent pair of said groups of parallel ribs, and means for restricting flow of coolant through said V-shaped passages.

References Cited in the file of this patent

UNITED STATES PATENTS

| | | |
|---|---|---|
| 1,331,177 | Bair | Feb. 17, 1920 |
| 1,598,867 | Lundelius | Sept. 7, 1926 |
| 1,952,967 | Boughton | Mar. 27, 1934 |
| 2,209,078 | Gettinger | July 23, 1940 |
| 3,007,460 | Bentele | Nov. 7, 1961 |

FOREIGN PATENTS

| | | |
|---|---|---|
| 498,741 | Canada | Dec. 29, 1953 |
| 804,502 | Germany | Apr. 23, 1951 |
| 19,171 | Great Britain | Nov. 9, 1901 |